(12) United States Patent
Wang et al.

(10) Patent No.: US 11,991,104 B2
(45) Date of Patent: May 21, 2024

(54) PTRS WITH DIFFERENT CONFIGURATION IN A SIDELINK GROUPCAST

(71) Applicant: QUALCOMM Incorporated, San Diego, CA (US)

(72) Inventors: Hua Wang, Basking Ridge, NJ (US); Sony Akkarakaran, Poway, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 17/363,683

(22) Filed: Jun. 30, 2021

(65) Prior Publication Data

US 2022/0077980 A1 Mar. 10, 2022

Related U.S. Application Data

(60) Provisional application No. 63/076,475, filed on Sep. 10, 2020.

(51) Int. Cl.
*H04W 72/04* (2023.01)
*H04L 5/00* (2006.01)
*H04W 76/00* (2018.01)
*H04W 88/08* (2009.01)
*H04W 92/18* (2009.01)

(52) U.S. Cl.
CPC .......... *H04L 5/0048* (2013.01); *H04W 92/18* (2013.01)

(58) Field of Classification Search
CPC .............................. H04L 5/0048; H04W 92/18
USPC .......................................................... 370/329
See application file for complete search history.

(56) References Cited

U.S. PATENT DOCUMENTS

| | | | | |
|---|---|---|---|---|
| 2019/0215118 A1* | 7/2019 | Molés Cases | ........ | H04L 5/0051 |
| 2019/0356463 A1* | 11/2019 | Zhang | ................... | H04W 76/27 |
| 2020/0052843 A1* | 2/2020 | Cheng | ................... | H04W 72/20 |
| 2020/0275425 A1* | 8/2020 | Cao | ........................ | H04L 1/0003 |
| 2021/0044402 A1* | 2/2021 | Gao | ........................ | H04L 5/0048 |
| 2021/0099265 A1* | 4/2021 | Shin | ................... | H04W 72/0453 |
| 2021/0344440 A1* | 11/2021 | Yoshioka | .............. | H04L 5/0046 |
| 2022/0393819 A1* | 12/2022 | Lee | ........................ | H04L 5/0094 |
| 2023/0054308 A1* | 2/2023 | Yang | ..................... | H04L 5/0048 |

FOREIGN PATENT DOCUMENTS

| | | | |
|---|---|---|---|
| WO | WO-2020222896 A1 * | 11/2020 | |
| WO | WO-2021228138 A1 * | 11/2021 | .............. H04W 4/00 |

* cited by examiner

*Primary Examiner* — Maharishi V Khirodhar
(74) *Attorney, Agent, or Firm* — Patterson + Sheridan, LLP

(57) ABSTRACT

Aspects of the present disclosure can be implemented in a method for wireless communication by a user equipment (UE). The method generally includes receiving PTRSs. The method generally includes receiving configuration information associated with a plurality of configurations of the PTRSs. The method generally includes determining which one of the PTRSs to process based on the configuration information. The method generally includes processing the determined PTRS.

30 Claims, 15 Drawing Sheets

High density PTRS    Low density PTRS

700

| Scheduled MCS | Time density ($L_{PT-RS}$) |
|---|---|
| $I_{MCS}$ < ptrs-MCS$_1$ | PT-RS is not present |
| ptrs-MCS1 $\leq$ $I_{MCS}$ < ptrs-MCS2 | 4 |
| ptrs-MCS2 $\leq$ $I_{MCS}$ < ptrs-MCS3 | 2 |
| ptrs-MCS3 $\leq$ $I_{MCS}$ < ptrs-MCS4 | 1 |

| Scheduled bandwidth | Frequency density ($K_{PT-RS}$) |
|---|---|
| $N_{RB} < N_{RB0}$ | PT-RS is not present |
| $N_{RB0} \leq N_{RB} \leq N_{RB1}$ | 2 |
| $N_{RB1} \leq N_{RB}$ | 4 |

FIG. 8

```
SL-PTRS-Config-r16::= SEQUENCE {
    Sl-PTRS-FreqDensity-r16    SEQUENCE (SIZE (2)) OF INTEGER (1..276)
    Sl-PTRS-TimeDensity-r16    SEQUENCE (SIZE (3)) OF INTEGER (0..29)
    Sl-PTRS-RE-Offset-r16      ENUMERATED {offset01, offset10, offset11}
    ...
}
```

PTRS WITH DIFFERENT CONFIGURATION IN A SIDELINK GROUPCAST

CROSS REFERENCE TO RELATED APPLICATION

This application hereby claims priority under 35 U.S.C. § 119 to U.S. Provisional Patent Application No. 63/076,475, filed on Sep. 10, 2020, the contents of which are incorporated herein in their entirety.

FIELD OF THE DISCLOSURE

Aspects of the present disclosure relate to wireless communications, and more particularly, to techniques for processing physical tracking reference signals (PTRSs) by user equipments (UEs) in a group based on configuration information associated with a plurality of configurations of the PTRSs.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more BSs may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or a DU may communicate with a set of UEs on downlink channels (e.g., for transmissions from the BS or the DU to the UE) and uplink channels (e.g., for transmissions from the UE to the BS or the DU).

These multiple access technologies have been adopted in various telecommunication standards to provide a common protocol that enables different wireless devices to communicate on a municipal, national, regional, and even global level. The NR (e.g., new radio or 5G) is an example of an emerging telecommunication standard. The NR is a set of enhancements to the LTE mobile standard promulgated by 3GPP. The NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, the NR supports beamforming, multiple-input multiple-output (MIMO) antenna technology, and carrier aggregation.

However, as the demand for mobile broadband access continues to increase, there exists a need for further improvements in the NR and the LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved techniques for processing of physical tracking reference signals (PTRSs) by user equipments (UEs) in a group based on configuration information associated with a plurality of configurations of the PTRSs.

Certain aspects of the subject matter described in this disclosure can be implemented in a method for wireless communications by a UE. The method generally includes receiving PTRSs. The method generally includes receiving configuration information associated with a plurality of configurations of the PTRSs. The method generally includes determining which one of the PTRSs to process based on the configuration information. The method generally includes processing the determined PTRS.

Certain aspects of the subject matter described in this disclosure can be implemented in a method for wireless communications by a UE. The method generally includes configuring PTRSs to have a plurality of configurations. The method generally includes transmitting the PTRSs and configuration information to a plurality of user equipments where the configuration information is associated with the plurality of configurations of the PTRSs.

Certain aspects of the subject matter described in this disclosure can be implemented in a UE. The UE generally includes means for receiving phase tracking reference signals (PTRSs), means for receiving configuration information associated with a plurality of configurations of the PTRSs, means for determining which one of the PTRSs to process based on the configuration information, and means for processing the determined PTRS.

Certain aspects of the subject matter described in this disclosure can be implemented in a UE. The UE generally includes means for configuring phase tracking reference signals (PTRSs) to have a plurality of configurations and means for transmitting the PTRSs and configuration information to a plurality of user equipments, the configuration information being associated with the plurality of configurations of the PTRSs.

Certain aspects of the subject matter described in this disclosure can be implemented in a UE. The UE generally includes a processing system configured to configure phase tracking reference signals (PTRSs) to have a plurality of configurations and a transmitter configured to transmit the PTRSs and configuration information to a plurality of user equipments, the configuration information being associated with the plurality of configurations of the PTRSs.

Certain aspects of the subject matter described in this disclosure can be implemented in a UE. The UE generally includes a receiver configured to receive phase tracking reference signals (PTRSs) and receive configuration information associated with a plurality of configurations of the PTRSs, and a processing system configured to determine which one of the PTRSs to process based on the configuration information and process the determined PTRS.

Certain aspects of the subject matter described in this disclosure can be implemented in an apparatus for wireless communications by a UE. The apparatus generally includes an interface configured to obtain phase tracking reference signals (PTRSs) and obtain configuration information associated with a plurality of configurations of the PTRSs, and a processing system configured to determine which one of the PTRSs to process based on the configuration information and process the determined PTRS.

Certain aspects of the subject matter described in this disclosure can be implemented in an apparatus for wireless communications by a UE. The apparatus generally includes a processing system configured to configure phase tracking reference signals (PTRSs) to have a plurality of configurations and an interface configured to output, for transmission, the PTRSs and configuration information to a plurality of user equipments, the configuration information being associated with the plurality of configurations of the PTRSs.

Certain aspects of the subject matter described in this disclosure can be implemented in a computer-readable medium for wireless communications by a UE. The computer-readable medium generally include codes executable by an apparatus to obtain phase tracking reference signals (PTRSs), obtain configuration information associated with a plurality of configurations of the PTRSs, determine which one of the PTRSs to process based on the configuration information, and process the determined PTRS.

Certain aspects of the subject matter described in this disclosure can be implemented in a computer-readable medium for wireless communications by a UE. The computer-readable medium generally include codes executable by an apparatus to configure phase tracking reference signals (PTRSs) to have a plurality of configurations and output, for transmission, the PTRSs and configuration information to a plurality of user equipments, the configuration information being associated with the plurality of configurations of the PTRSs.

Aspects of the present disclosure provide UEs, means for, apparatuses, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 7 illustrates an example table of a time density of phase tracking reference signals (PTRSs) as a function of a scheduled modulation and coding scheme (MCS), in accordance with certain aspects of the present disclosure.

FIG. 8 illustrates an example table of a frequency density of PTRSs as a function of a scheduled bandwidth, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
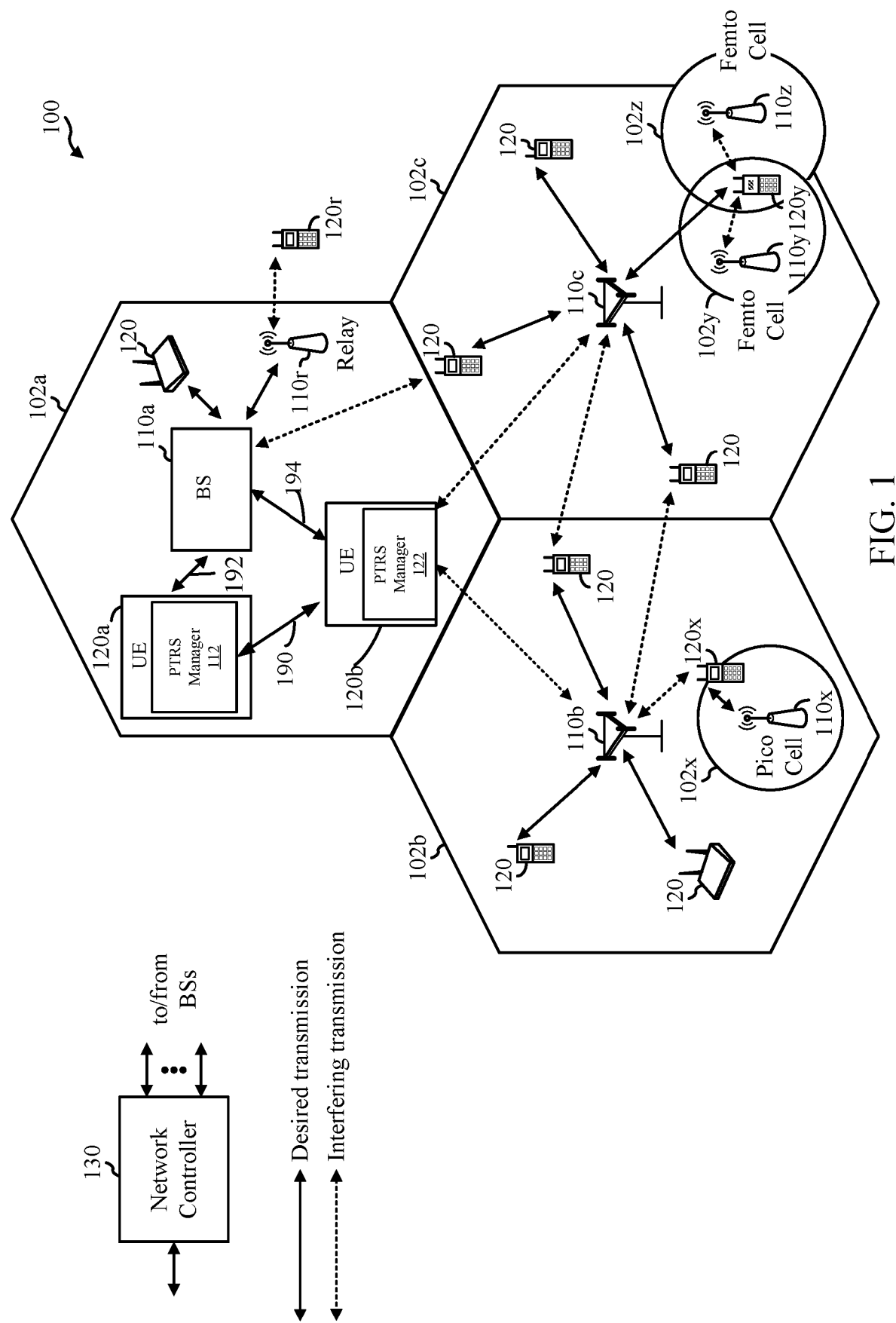
FIG. 1 is a block diagram conceptually illustrating an example wireless system, in accordance with certain aspects of the present disclosure.

Aspects of the present disclosure provide techniques for configuring physical tracking reference signals (PTRSs) to have a plurality of configurations. A transmitter user equipment (UE) within a group of UEs may configure the PTRSs to have the plurality of configurations. The transmitter UE may send the PTRSs to receiver UEs within the group. The transmitter UE may send configuration information associated with the plurality of configurations of the PTRSs to the receiver UEs. Each receiver UE may determine which one of the received PTRSs to process based on the configuration information. Each receiver UE may process the determined PTRS.

The following description provides examples of the techniques for processing the PTRSs, by the receiver UEs in the group, based on the configuration information associated with the plurality of configurations of the PTRSs, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G New Radio (NR)) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100 in which aspects of the present disclosure may be performed. The wireless communication network 100 may be an NR system (e.g., a 5G NR network).

As illustrated in FIG. 1, the wireless communication network 100 may include a number of base stations (BSs) or access points (APs) 110a-z (each also individually referred to herein as BS (or AP) 110 or collectively as BSs (or APs) 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

The BSs 110 and the UEs 120 may be configured for sidelink communications. The BS 110a includes a sidelink manager (not shown). The sidelink manager may be configured to allocate component carriers for sidelink communications (e.g., a sidelink 190 between the UE 120a (operating as a transmitter UE within a group of UEs 120) and a UE 120b (operating as a receiver UE within the group of UEs 120)). The request may be received via an access link, such as an access link 192 or an access link 194.

As shown in FIG. 1, the UE 120a includes a PTRS manager 112 and the UE 120b includes a PTRS manager 122. The PTRS manager 112 may be configured to configure physical tracking reference signals (PTRSs) to have a plurality of configurations. The PTRS manager 122 may be configured to process the PTRSs based on configuration information associated with the plurality of configurations of the PTRSs. The UE 120b and the UE 120a may be configured to perform operations 1100 and 1200 of FIGS. 11 and 12, respectively.

The wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul (for example, an S1 interface between MME and eNBs, or an NG interface between AMF and gNB). The BSs 110 may also communicate with one another (e.g., directly or indirectly) via wireless or wireline backhaul (for example, an X2 or Xn interface).

Figure 2:
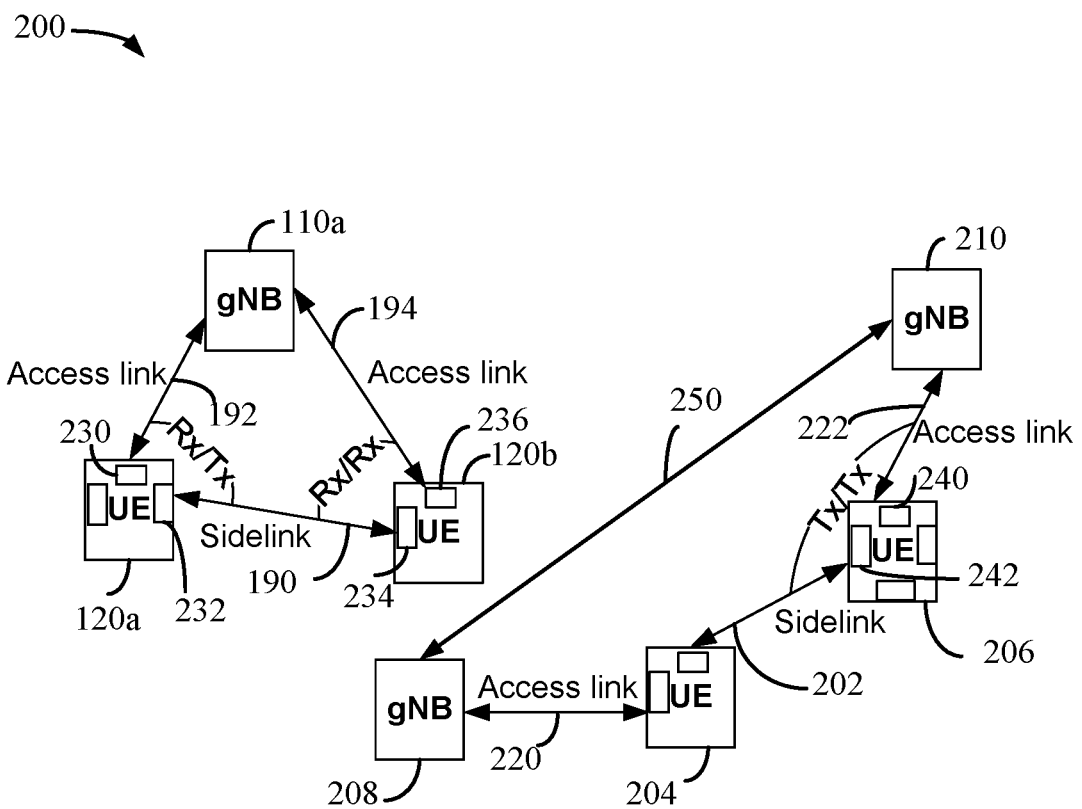
FIG. 2 is a block diagram conceptually illustrating an example wireless communication network, in accordance with certain aspects of the present disclosure.

FIG. 2 illustrates an example wireless communication network 200 implemented using an access link and a sidelink. A sidelink generally refers to a communication link between two UEs. For example, the sidelink may include a PC5 interface between vehicles for a vehicle to everything (V2X) protocol.

An access link generally refers to a communication link between a UE and a base station (e.g., a gNodeB (gNB), eNodeB (eNB), or NodeB (NB)). For instance, the access link may be a Uu interface. In some cases, the sidelink may be implemented with a single CC, carrier aggregation (CA), or dual connectivity (DC). The access link may be implemented with a single CC, CA, and for multiple radio access technologies (RATs).

As illustrated, a sidelink 190 may be implemented between the UE 120a and the UE 120b. A sidelink 202 may also be implemented between a UE 204 and a UE 206. The UEs 120a, 120b may be served by the same base station 110a (e.g., gNB), whereas the UEs 204, 206 may be served by different base stations 208, 210. For instance, an access link 192, 194 may be configured between the BS 110a and each of the UEs 120a, 120b. Moreover, an access link 220, 222 may be configured between a respective one of the BSs 208, 210 and a respective one of the UEs 204, 206. The access link and sidelink may use different component carriers, in certain aspects. In some cases, a UE may act as a wireless relay, reducing the number of BSs with connectivity to the core network (CN) that need to be deployed in any given area.

To facilitate sidelink communication, each of the UEs may include multiple panels (e.g., radio-frequency (RF) front-end (RFFE) circuitry) that allow for simultaneous reception (Rx) and/or transmission (Tx) via separate communication links. For instance, the UE 120a may include a panel 230 which may be used for the reception (Rx) via the access link 192, and a panel 232 which may be used for transmission (Tx) via the sidelink 190, as illustrated. Similarly, the UE 120b may include a panel 234 for Rx via the sidelink 190 and a panel 236 for Rx via the access link 194.

As illustrated, the UE 206 may also include a panel 240 for Tx via the access link 222 and a panel 242 for Tx via the sidelink 202. Moreover, the BSs 110a, 208, 210 may also include multiple panels (not shown). While each UE is illustrated with two, three, or four panels to facilitate understanding, the UEs may include any number of panels. In certain aspects, a backhaul interface 250 may be implemented between the BSs 208, 210.

Figure 3:
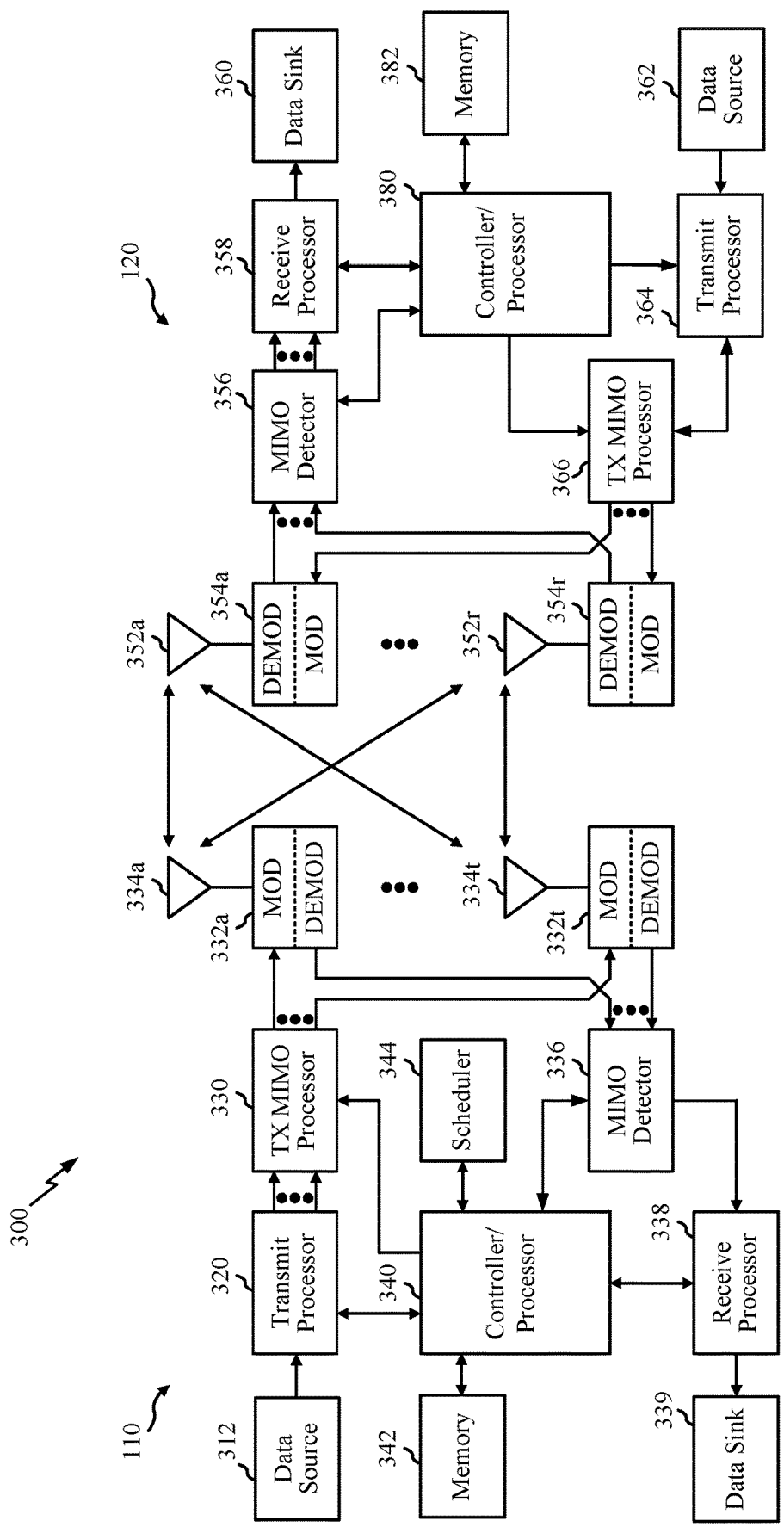
FIG. 3 illustrates example components of a base station (BS) and a user equipment (UE), in accordance with certain aspects of the present disclosure.

FIG. 3 illustrates example components 300 of an AP 110 and a UE 120 (as depicted in FIG. 1), which may be used to implement aspects of the present disclosure. The UE 120 may include antennas 352, processors 366, 358, 364, and/or a controller/processor 380, which may be used to perform various techniques and methods described herein. In one example, the controller/processor 380 of the UE 120 (such as the UE 120a) may include the PTRS manager 112 configured to perform operations 1200 of FIG. 12. In another example, the controller/processor 380 of the UE 120 (such as the UE 120b) may include the PTRS manager 122 configured to perform operations 1100 of FIG. 11. The BS 110 may include antennas 334, processors 320, 330, 338, and/or a controller/processor 340, which may be used to perform various techniques and methods described herein.

As shown in FIG. 3, the processor 340 includes a full-duplex (FD) slot configuration circuit 290 that may be configured for full-duplex slot configuration in an IAB communication systems, according to aspects described herein. In certain aspects, the FD slot communication circuit 290 enables the processor 340 to detect a change in one or more traffic parameters, and dynamically modify a slot pattern based on the change in the one or more traffic parameters. In certain aspects, the AP 110 may be an IAB donor node, a parent node, or an IAB child node.

At the AP 110, a transmit processor 320 may receive data from a data source 312 and control information from the controller/processor 340. The control information may be for a physical broadcast channel (PBCH), a physical control format indicator channel (PCFICH), a physical hybrid ARQ indicator channel (PHICH), a physical downlink control channel (PDCCH), a group common PDCCH (GC PDCCH), etc. The data may be for a physical downlink shared channel (PDSCH), etc. The processor 320 may process (e.g., encode and symbol map) the data and the control information to obtain data symbols and control symbols, respectively. The transmit processor 320 may also generate reference symbols, e.g., for a primary synchronization signal (PSS), a secondary synchronization signal (SSS), and a cell-specific reference signal (CRS). A transmit MIMO processor 330 may perform spatial processing (e.g., precoding) on the data symbols, the control symbols, and/or the reference symbols, if applicable, and may provide output symbol streams to the modulators (MODs) 332a through 332t. Each MOD 332 may process a respective output symbol stream (e.g., for OFDM, etc.) to obtain an output sample stream. Each MOD may further process (e.g., convert to analog, amplify, filter, and upconvert) the output sample stream to obtain a DL signal. The DL signals from MODs 332a through 332t may be transmitted via the antennas 334a through 334t, respectively.

At the UE 120, the antennas 352a through 352r may receive the DL signals from the AP 110 and may provide received signals to the demodulators (DEMODs) in transceivers 354a through 354r, respectively. Each DEMOD in the transceiver 354 may condition (e.g., filter, amplify, downconvert, and digitize) a respective received signal to obtain input samples. Each DEMOD in the transceiver 354 may further process the input samples (e.g., for OFDM, etc.)

to obtain received symbols. A MIMO detector 356 may obtain received symbols from all the DEMODs in the transceivers 354a through 354r, to perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the UL, at the UE 120, a transmit processor 364 may receive and process data (e.g., for a physical uplink shared channel (PUSCH)) from a data source 362 and the control information (e.g., for a physical uplink control channel (PUCCH)) from the controller/processor 380. The transmit processor 364 may also generate reference symbols for a reference signal (e.g., for the sounding reference signal (SRS)). The symbols from the transmit processor 364 may be precoded by a TX MIMO processor 366 if applicable, further processed by the DEMODs in the transceivers 354a through 354r (e.g., for SC-FDM, etc.), and transmitted to the AP 110. At the AP 110, the UL signals from the UE 120 may be received by the antennas 334, processed by the MODs 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the AP 110 and the UE 120, respectively. The processor 340 and/or other processors and modules at the AP 110 may perform or direct the execution of processes for the techniques described herein. Memories 342 and 382 may store data and program codes for the AP 110 and UE 120, respectively. A scheduler 344 may schedule the UEs for data transmission on the DL and/or the UL.

Figure 4:
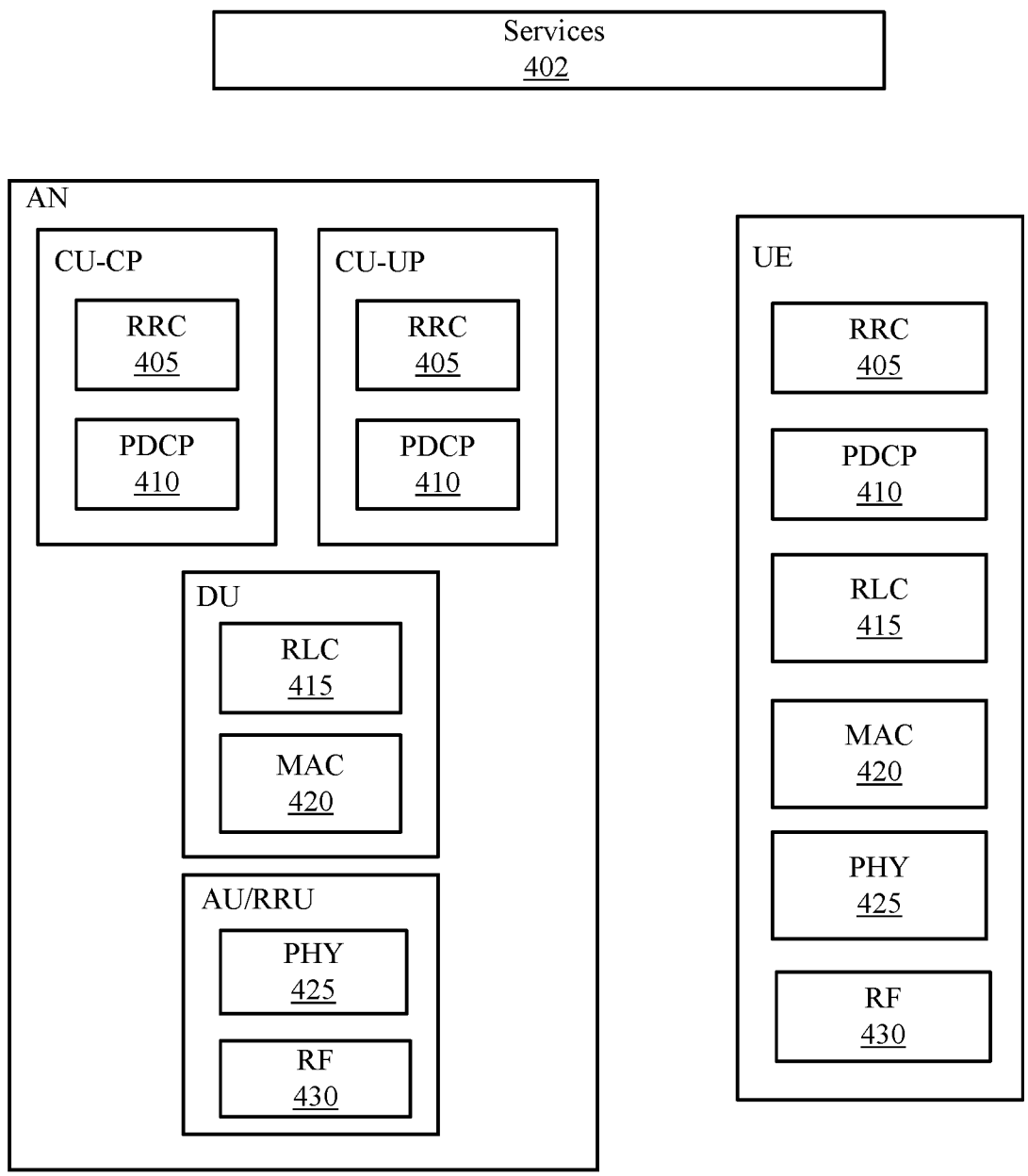
FIG. 4 is a block diagram illustrating an example communications protocol stack in a radio access network (RAN), in accordance with certain aspects of the present disclosure.

FIG. 4 illustrates a diagram showing examples for implementing a communications protocol stack 400 in a RAN (e.g., such as the RAN 200), according to aspects of the present disclosure. The communications protocol stack 400 may be implemented by devices operating in a wireless communication system, such as a 5G NR system (e.g., the wireless communication network 100 of FIG. 1). In various examples, layers of the communications protocol stack 400 may be implemented as separate modules of software, portions of a processor or application specific integrated circuit (ASIC), portions of non-collocated devices connected by a communications link, or various combinations thereof. Collocated and non-collocated implementations may be used, for example, in a protocol stack for a network access device or a UE. As shown in FIG. 4, the wireless communication system may support various services 402 over one or more protocols. One or more protocol layers of the communication protocol stack 400 may be implemented by an AN (e.g., AN 208 in FIG. 2, or AP 110a in FIG. 1) and/or the UE (e.g., UE 120).

As shown in FIG. 4, the communication protocol stack 400 is split in the AN. A RRC layer 405, a PDCP layer 410, a RLC layer 415, a MAC layer 420, a PHY layer 425, and a RF layer 430 may be implemented by the AN. For example, the CU-CP (e.g., CU-CP 210 in FIG. 2) and the CU-UP e.g., CU-UP 212 in FIG. 2) each may implement the RRC layer 405 and the PDCP layer 410. A DU (e.g., DUs 214 and 218 in FIG. 2) may implement the RLC layer 415 and the MAC layer 420. However, the DU may also implement the PHY layer(s) 425 and the RF layer(s) 430 via an AU/RRU connected to the DU. The PHY layers 425 may include a high PHY layer and a low PHY layer.

The UE (e.g., UE 222a-222c) may implement the entire communications protocol stack 400 (e.g., the RRC layer 405, the PDCP layer 410, the RLC layer 415, the MAC layer 420, the PHY layer(s) 425, and the RF layer(s) 430).

Figure 5:
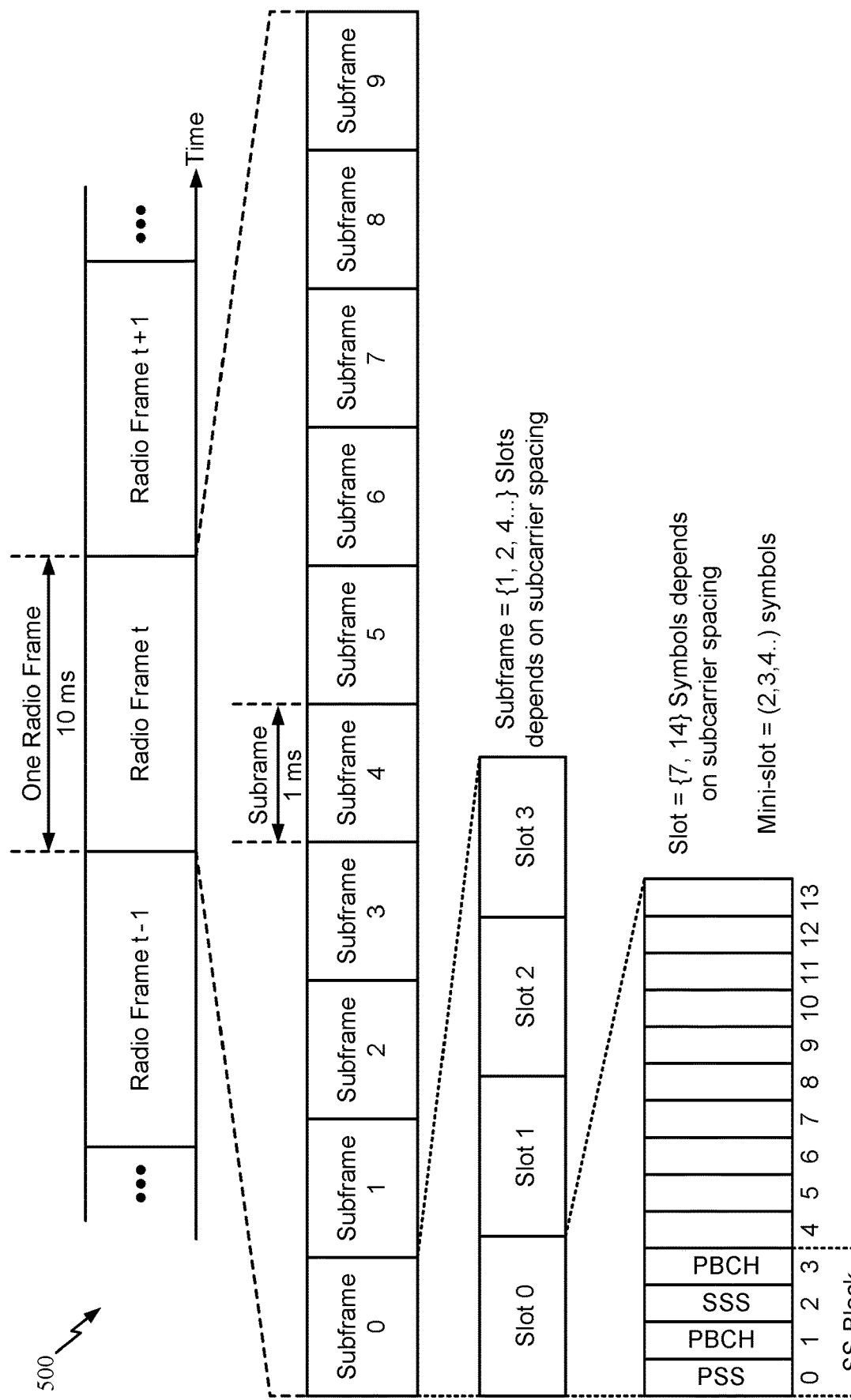
FIG. 5 is a block diagram is a diagram illustrating an example of a frame format for a new radio (NR), in accordance with certain aspects of the present disclosure.

FIG. 5 is a diagram showing an example of a frame format 500 for NR. The transmission timeline for each of DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., the DL, the UL, or flexible) for data transmission and the link direction for each subframe may be dynamically switched. The link directions may be based on a slot format. Each slot may include DL/UL data as well as DL/UL control information.

In the NR, a SSB is transmitted. The SSB includes a PSS, a SSS, and a two symbol PBCH. The SSB can be transmitted in a fixed slot location, such as the symbols 0-3 as shown in FIG. 5. The PSS and the SSS may be used by UEs for cell search and acquisition. The PSS may provide half-frame timing, the SS may provide CP length and frame timing. The PSS and the SSS may provide cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs) such as system information block type 1 (SIB1), other system information (OSI) can be transmitted on a PDSCH in certain subframes. The SS block can be transmitted up to sixty-four times, for example, with up to sixty-four different beam directions for mmW. The up to sixty-four transmissions of the SS block are referred to as the SS burst set. The SS blocks in an SS burst set are transmitted in a same frequency region, while the SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through a scheduling entity (e.g., UE or AP), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a RRC dedicated state, etc.) or a configuration associated with transmitting pilots using a common set of resources (e.g., an RRC common state, etc.). When operating in the RRC dedicated state, the UE may select the dedicated set of resources for transmitting a pilot signal to a network. When operating in the RRC common state, the UE may select the common set of resources for transmitting the pilot signal to the network. In either case, the pilot signal transmitted by the UE may be received by one or more network access devices, such as an AN, or a DU, or portions thereof. Each receiving network access device may be configured to receive and measure the pilot signals transmitted on the common set of resources, and also receive and measure the pilot signals transmitted on the dedicated sets of resources allocated to the UEs for which the network access device is a member of a monitoring set of network access devices for the UE. One or more of the receiving network access devices, or a CU to which the receiving network access device(s) transmit the measurements of the pilot signals, may use the measurements to identify serving cells for the UEs, or to initiate a change of the serving cell for one or more of the UEs.

Example Techniques for PTRSs Determination for Processing by a UE Based on PTRSs Configuration Aspects of the present disclosure provide techniques for configuring physical tracking reference signals (PTRSs). A transmitter user equipment (UE) within a group of UEs communicating with each other may configure the PTRSs. The transmitter UE may send the PTRSs to one or more receiver UEs within the group. The transmitter UE may send configuration information associated with a plurality of configurations of the PTRSs to the one or more receiver UEs. Each receiver UE may determine which one of the PTRSs to process based on the configuration information. Each receiver UE may process the determined one or more PTRSs.

In some wireless communication systems having a UE and a base station (BS), the BS may have a good phase coherence across its one or more antenna ports. The UE uplink transmission with two or more oscillators may be full-coherent, partial-coherent or non-coherent in phase. In such wireless communication systems, the PTRSs may be used for phase noise estimation. The PTRSs may track a phase of an oscillator at a transmitter and a receiver of the UE. The phase tracking may enable suppression of phase noise and common phase error (CPE), particularly at higher (e.g., mmWave) frequencies.

Time and frequency-domain resources for the PTRSs may be dynamically determined. For example, time density (e.g., which symbols) may be determined by a scheduled modulation and coding scheme (MCS), while frequency density may be determined by a scheduled bandwidth (e.g., in number of RBs).

Figure 6:
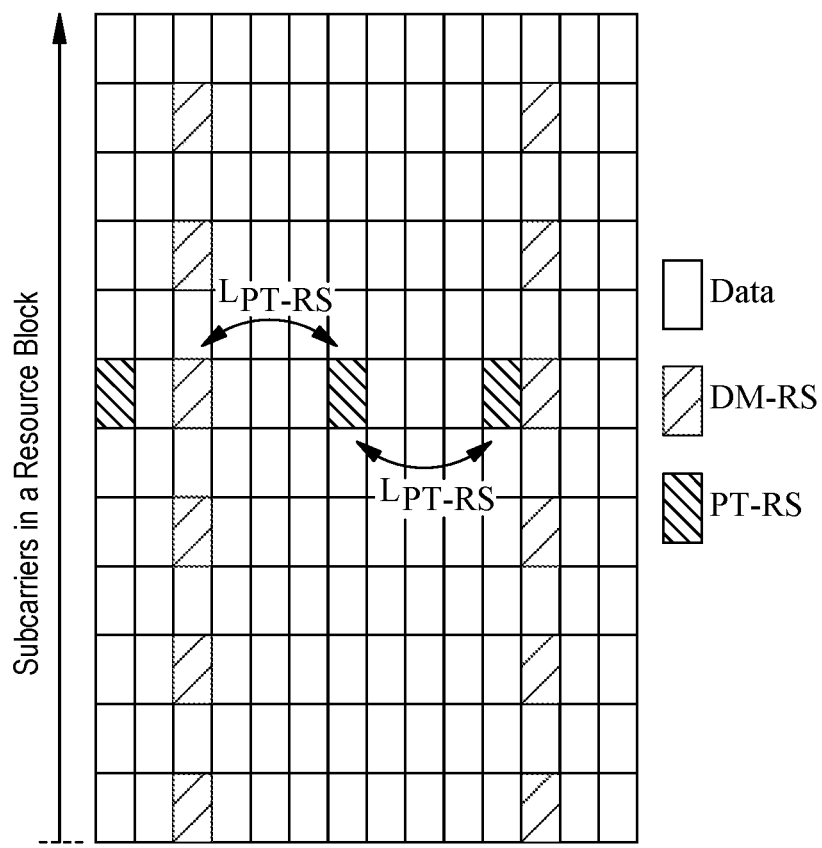
FIG. 6 illustrates example subcarriers in a resource block, in accordance with certain aspects of the present disclosure.

In a Rel-16 5G NR, the PTRS may be present in a resource block (as illustrated in a resource block 600 of FIG. 6). Radio resource control (RRC) signaling may provide semi-statically configurations for the PTRS based on the time density and the frequency density, via PTRS-DownlinkConfig and PTRS-UplinkConfig. Parameters, such as timeDensity and frequencyDensity in the PTRS-DownlinkConfig and the PTRS-UplinkConfig may indicate threshold values ptrs-MCS$_i$, 1=1,2,3 and N$_{RB,i}$, i=0,1, as illustrated in Table 700 of FIG. 7 and Table 800 of FIG. 8, respectively.

Aspects of the present disclosure provide wireless communication systems where a UE is able to communicate directly with other UEs (e.g., using a peer-to-peer (P2P) or device-to-device (D2D) protocol). A direct link between the two UEs is called a sidelink. One or more of a group of UEs utilizing D2D communications may be within a coverage area of a cell. Other UEs in such a group may be outside the coverage area of the cell, or otherwise unable to receive transmissions from a BS. In some cases, groups of UEs communicating via the D2D communications may utilize a one-to-many system in which each UE transmits to every other UE in the group. In some cases, the BS facilitates scheduling of resources for the D2D communications. In other cases, the D2D communications are carried out independent of the BS. The D2D communications may use one or more sidelink channels, such as a physical sidelink broadcast channel (PSBCH), a physical sidelink discovery channel (PSDCH), a physical sidelink shared channel (PSSCH), and a physical sidelink control channel (PSCCH).

Figure 9:
FIG. 9 illustrates an example of a sidelink PTRS configuration, in accordance with certain aspects of the present disclosure.

In a sidelink Rel-16 5G NR, the parameters such as the timeDensity and the frequencyDensity in the PTRS-UplinkConfig and the PTRS-DownlinkConfig are replaced by sl-PTRS-TimeDensity and sl-PTRS-FreqDensity in SL-PTRS-Config respectively. The SL-PTRS-Config is pre-configured based on at least the sl-PTRS-TimeDensity and the sl-PTRS-FreqDensity per a resource pool, as illustrated by SL-PTRS-Config 900 in FIG. 9.

In a sidelink groupcast, the receiver UEs in the group may have different phase noise. Accordingly, the receiver UEs may require different time and frequency density of the PTRSs. This is because when the time and the frequency density of all of the PTRSs is set according to a UE with a worst (or a largest) phase noise within the group, there may be unnecessary overhead for the UEs within the group that may have a smaller phase noise while processing the PTRSs. In addition, as the receiver UEs may dynamically join and leave the group, the worst phase noise requirement is also changing.

Figure 10:
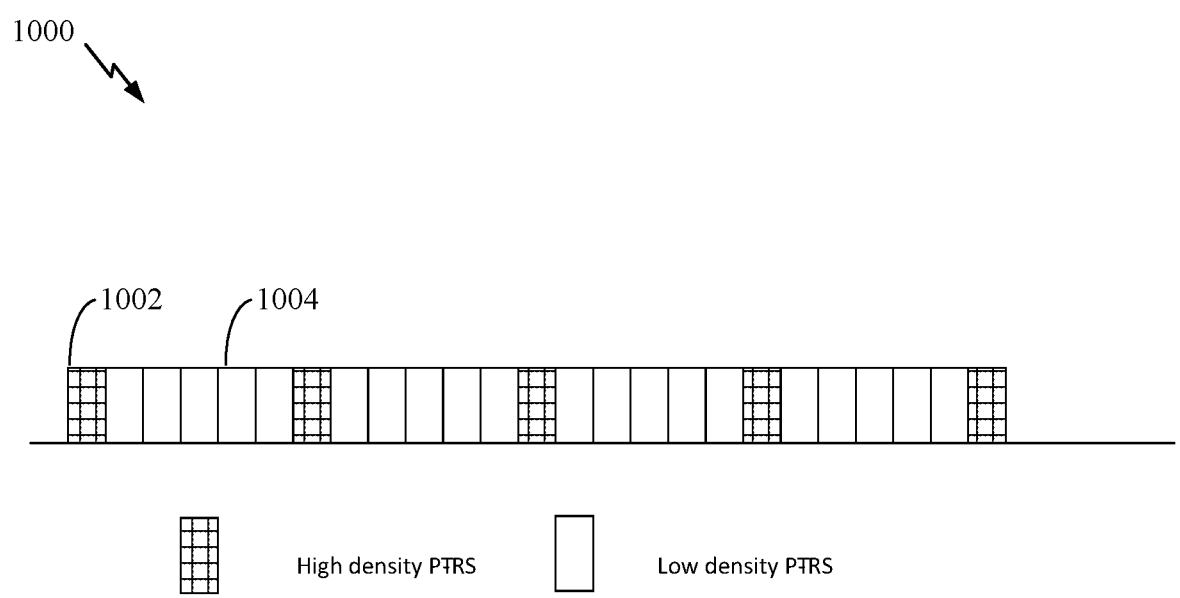
FIG. 10 illustrates an example of different configurations of PTRSs, in accordance with certain aspects of the present disclosure.

In order to prevent any unnecessary overhead for the UEs within the group processing the PTRSs, different configurations of the PTRSs associated with different time scale may be used. The different configurations of the PTRSs may be based on a time density, a frequency density, and/or a resource element (RE) offset. As illustrated in FIG. 10, different configurations of PTRSs 1000 may include high density PTRSs 1002 having a long time interval and low density PTRSs 1004 having a small time interval. The transmitter UE within the group may send the different configurations of the PTRSs 1000 to the receiver UEs in the group through RRC signaling. Each receiver UE may select one of the configurations of the PTRSs as a possible configuration for a correct PTRS pattern for a sidelink slot. In some cases, a configuration of a PTRS for the sidelink slot may be included in sidelink control information (SCI) of the transmitter UE PSSCH. In such cases, each receiver UE may use the SCI to determine the PTRS for the sidelink slot and then process the determined PTRS.

Figure 11:
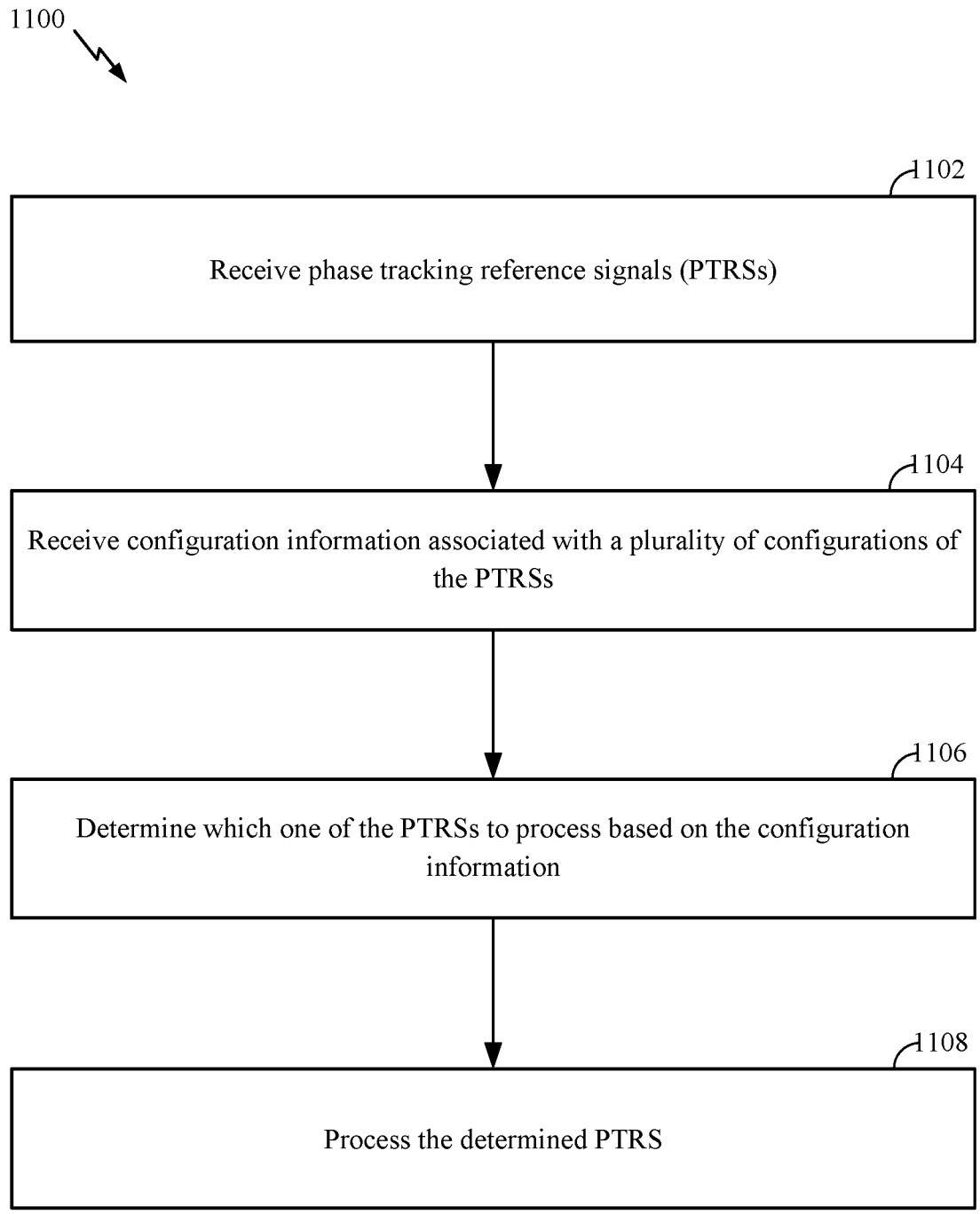
FIG. 11 is a flow diagram illustrating example operations for wireless communication by a UE in a group of UEs, in accordance with certain aspects of the present disclosure.

FIG. 11 illustrates example operations 1100 for wireless communication, in accordance with certain aspects of the present disclosure. The operations 1100 may be performed, for example, by a UE (e.g., such as the UE 120$b$ in the wireless communication network 100 of FIG. 1). The UE is a receiver UE within a group of multiple UEs communicating with each other.

Operations 1100 begin at 1102, by receiving PTRSs. At 1104, the UE receives configuration information associated with a plurality of configurations of the PTRSs. The plurality of configurations of the PTRSs are based on a time density, a frequency density, and/or a resource element (RE) offset.

In addition, each of the plurality of configurations of the PTRSs is associated with a different time scale.

In one non-limiting example, the PTRSs include first PTRSs and second PTRSs. The first PTRSs have a first configuration. The second PTRSs have a second configuration. The configurations of the first PTRSs and the second PTRSs is such that the first PTRSs have a higher density than the second PTRSs. Furthermore, the configurations of the first PTRSs and the second PTRSs is such that the first PTRSs have a longer time interval than the second PTRSs.

The UE receives the configuration information associated with the plurality of configurations of the PTRSs via one or more channels. In one non-limiting example, the UE receives the configuration information associated with the plurality of configurations of the PTRSs via a RRC signaling. In another non-limiting example, the UE receives the configuration information associated with the plurality of configurations of the PTRSs via a PSCCH.

When the UE receives the configuration information associated with the plurality of configurations of the PTRSs via the RRC signaling, the configuration information includes a first sidelink control information message. The first sidelink control information message includes an index to indicate which one of the plurality of configurations of the PTRSs is used in a sidelink slot.

When the UE receives the configuration information associated with the plurality of configurations of the PTRSs not via the RRC signaling (for example, via the PSCCH), the configuration information includes a second sidelink control information message. The second sidelink control information message includes full configuration information of at least one of the PTRSs used in the sidelink slot.

At 1106, the UE determines which one of the PTRSs to process based on the received configuration information associated with the plurality of configurations of the PTRSs. At 1108, the UE processes the determined PTRS by measuring the determined PTRS, and using the measurement to track a phase of an oscillator of the UE.

Figure 12:
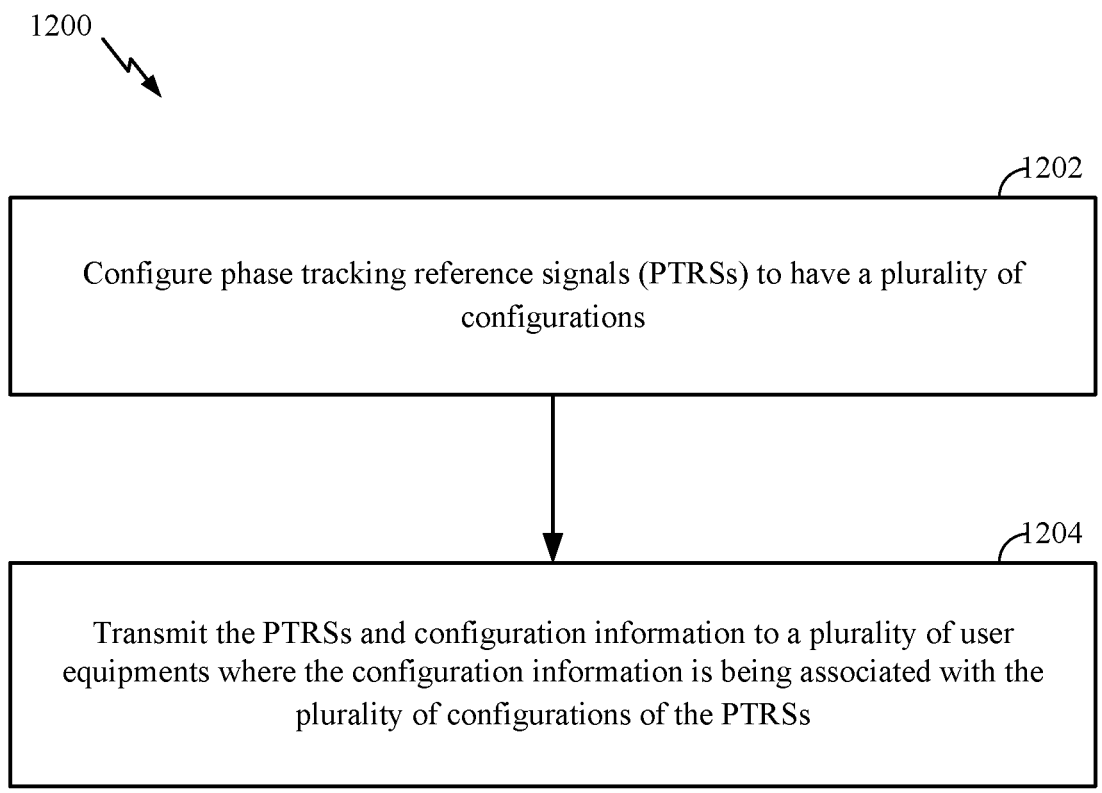
FIG. 12 is a flow diagram illustrating example operations for wireless communication by a UE in a group of UEs, in accordance with certain aspects of the present disclosure.

FIG. 12 illustrates example operations 1200 for wireless communication, in accordance with certain aspects of the present disclosure. The operations 1200 may be performed, for example, by a UE (e.g., such as the UE 120a in the wireless communication network 100 of FIG. 1). The UE is a transmitter UE within a group of multiple UEs communicating with each other.

Operations 1200 begin at 1202, by configuring PTRSs to have a plurality of configurations. The plurality of configurations of the PTRSs are based on a time density, a frequency density, and/or a RE offset. Each of the plurality of configurations of the PTRSs is associated with a different time scale.

In one non-limiting example, the PTRSs include first PTRSs and second PTRSs. The first PTRSs have a first configuration. The second PTRSs have a second configuration. The configurations of the first PTRSs and the second PTRSs is such that the first PTRSs have a higher density than the second PTRSs. Additionally, the configurations of the first PTRSs and the second PTRSs is such that the first PTRSs have a longer time interval than the second PTRSs.

At 1206, the UE transmits the PTRSs and configuration information to a plurality of other UEs within the group. The configuration information is associated with the plurality of configurations of the PTRSs.

The UE transmits the configuration information to the plurality of other UEs via one or more channels. In one non-limiting example, the UE transmits the configuration information to the plurality of other UEs via a RRC signaling. The configuration information transmitted via the RRC signaling includes a first sidelink control information message. The first sidelink control information message includes an index to indicate which one of the plurality of configurations of the PTRSs is used in a sidelink slot. In another non-limiting example, the UE transmits the configuration information to the plurality of other UEs via a PSCCH. The configuration information transmitted via the PSCCH includes a second sidelink control information message. The second sidelink control information message includes full configuration information of at least one of the PTRSs used in the sidelink slot.

Figure 13:
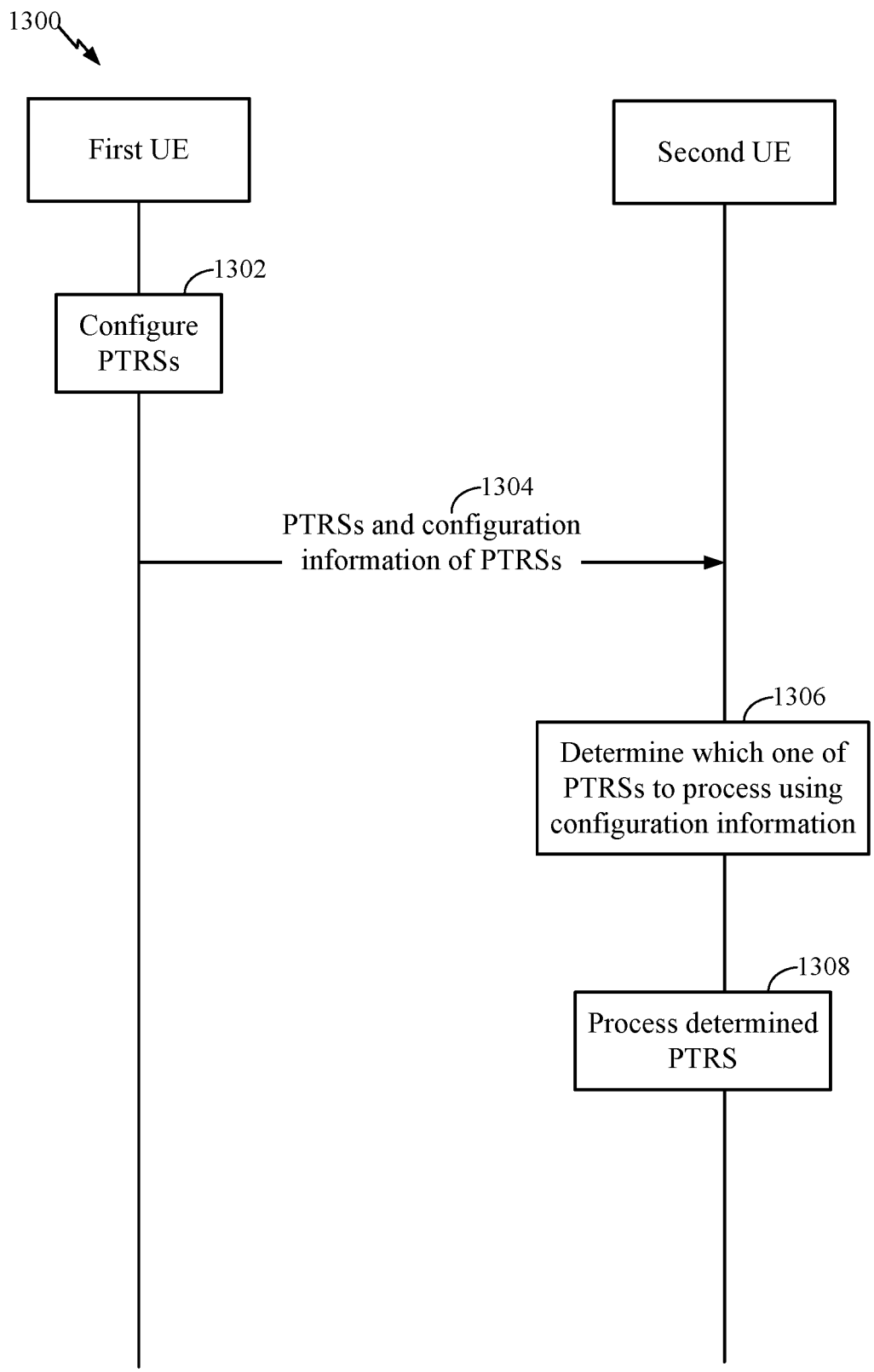
FIG. 13 is a call flow diagram illustrating example signaling between a receiver UE and a transmitter UE in a group, in accordance with aspects of the present disclosure.

FIG. 13 shows a call flow diagram with an exchange of signaling between a first UE (e.g., the UE 120a in the wireless communication network 100 of FIG. 1) and a second UE (e.g., the UE 120b in the wireless communication network 100 of FIG. 1). The first UE and the second UE may communicate with each other to transmit PTRSs and configuration information associated with a plurality of configurations of the PTRSs. Initially, at 1302, the first UE may configure the PTRSs to have the plurality of configurations. At 1304, the first UE may send the PTRSs and the configuration information to the second UE. At 1306, the second UE may determine which one of the PTRSs to process using the configuration information. At 1308, the second UE may process the determined PTRS.

Figure 14:
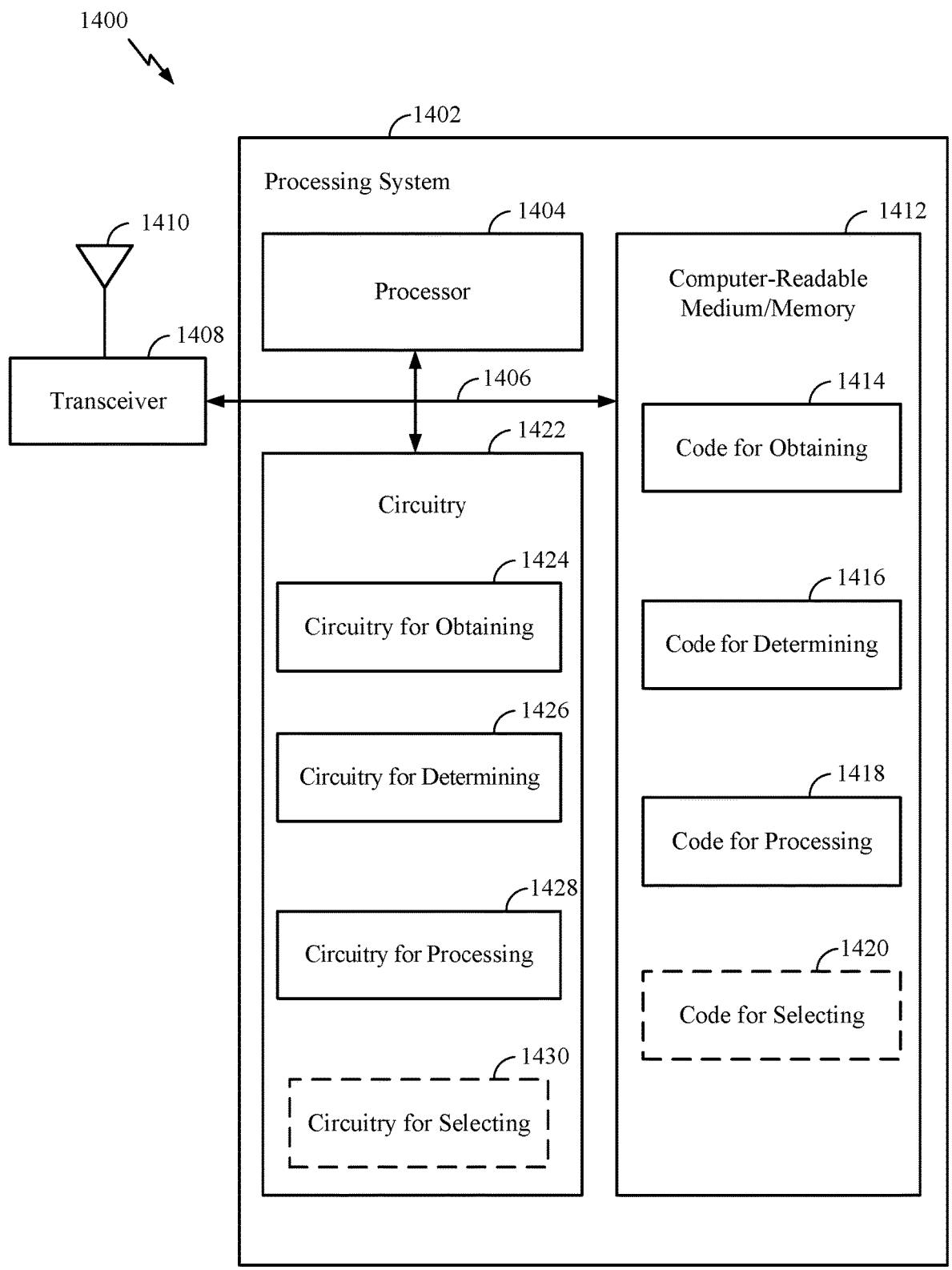
FIG. 14 illustrates a communications device that may include various components configured to perform operations for techniques disclosed herein, in accordance with aspects of the present disclosure.

FIG. 14 illustrates a communications device 1400 (e.g., such as the UE 120b in the wireless communication network 100 of FIG. 1) that may include various components (e.g., corresponding to means-plus-function components) configured to perform operations for techniques disclosed herein, such as the operations illustrated in FIG. 11. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 11, or other operations for performing the various techniques discussed herein for processing PTRSs based on configuration information associated with a plurality of configurations of the PTRSs. In certain aspects, the computer-readable medium/memory 1412 stores code for obtaining 1414, code for determining 1416, code for processing 1418, and/or code for selecting 1420. In certain aspects, the processing system 1402 has circuitry 1422 configured to implement the code stored in the computer-readable medium/memory 1412. The circuitry 1422 is coupled to the processor 1404 and/or the computer-readable medium/memory 1412 via the bus 1406. For example, the circuitry 1422 includes circuitry for obtaining 1424 (an example of means for obtaining), circuitry for determining 1426 (an example of means for determining), circuitry for processing 1428 (an example of means for processing), and/or circuitry for selecting 1430 (an example of means for selecting).

Means for receiving may include an antenna (e.g., the antennas 352a-352r), a transceiver (e.g., the transceivers 354a-354r), a processor (e.g., the controller/processor 380), and/or circuitry for obtaining (e.g., the circuitry for obtaining 1424). Means for determining may include a processor (e.g., the controller/processor 380) and/or circuitry for determining (e.g., the circuitry for determining 1426). Means for processing may include a processor (e.g., the controller/ processor 380) and/or circuitry for processing (e.g., the circuitry for processing 1428). Means for selecting may include a processor (e.g., the controller/processor 380) and/ or circuitry for selecting (e.g., the circuitry for selecting 1430). Means for measuring may include a processor (e.g., the controller/processor 380) and/or circuitry for measuring. Means for using may include a processor (e.g., the controller/processor 380) and/or circuitry for using. In certain aspects, various processors and/or various circuitry may include a circuit, a central processing unit (CPU), a graphics processing unit (GPU), a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein.

Figure 15:
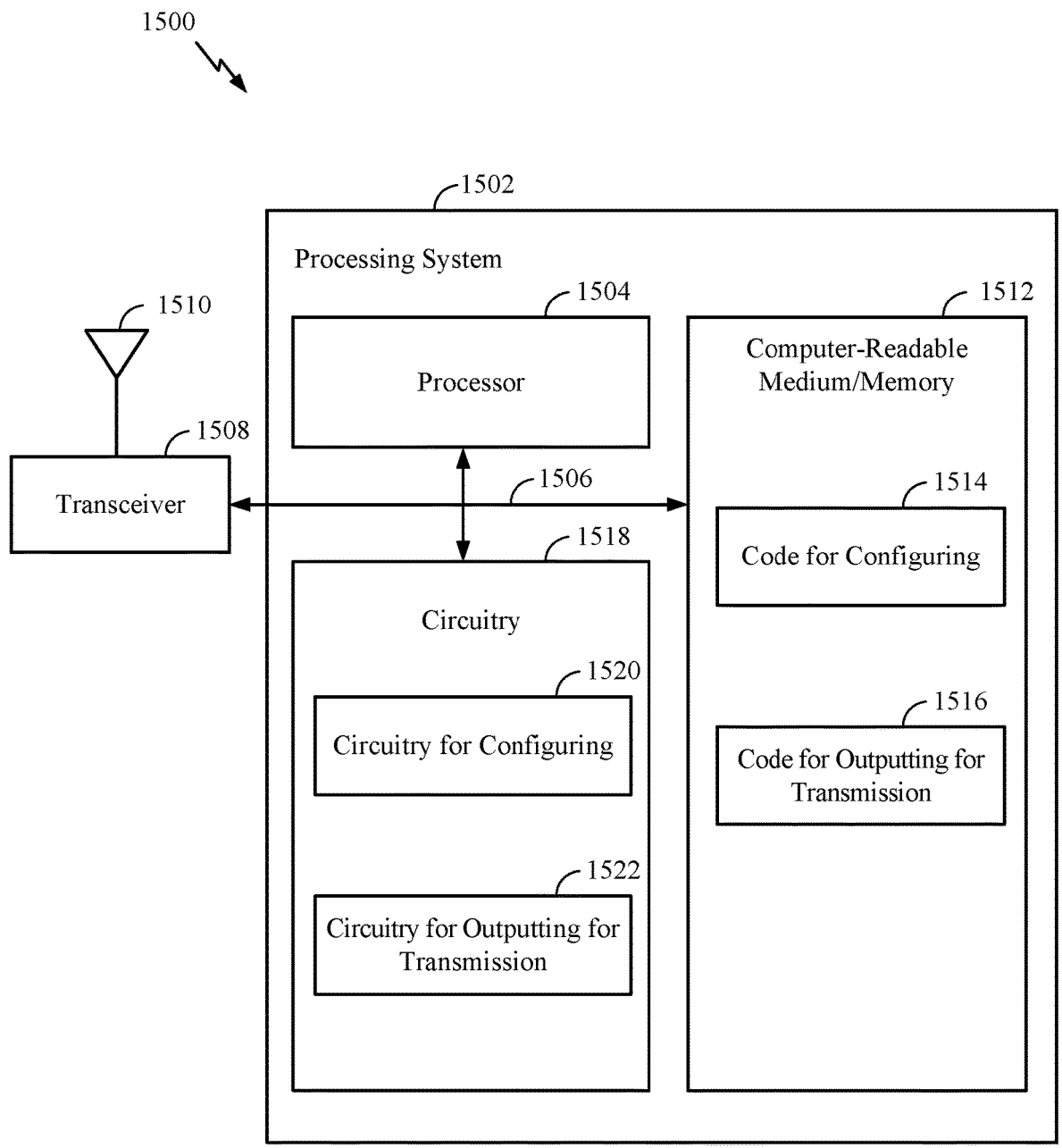
FIG. 15 illustrates a communications device that may include various components configured to perform operations for techniques disclosed herein, in accordance with aspects of the present disclosure.

FIG. 15 illustrates a communications device 1500 (e.g., such as the UE 120a in the wireless communication network 100 of FIG. 1) that may include various components (e.g., corresponding to means-plus-function components) configured to perform operations for techniques disclosed herein, such as the operations illustrated in FIG. 12. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/ memory 1512 is configured to store instructions (e.g., computer-executable code) that when executed by the processor 1504, cause the processor 1504 to perform the operations illustrated in FIG. 12, or other operations for performing the various techniques discussed herein for configuring PTRSs to have a plurality of configurations. In certain aspects, the computer-readable medium/memory 1512 stores code for configuring 1514 and/or code for outputting 1516. In certain aspects, the processing system 1502 has circuitry 1518 configured to implement the code stored in the computer-readable medium/memory 1512. The circuitry 1518 is coupled to the processor 1504 and/or the computer-readable medium/memory 1512 via the bus 1506. For example, the circuitry 1518 includes circuitry for configuring 1520 (an example of means for configuring) and/or circuitry for outputting 1522 (an example of means for outputting).

Means for configuring may include a processor (e.g., the controller/processor 380) and/or circuitry for configuring (e.g., the circuitry for configuring 1520). Means for transmitting may include an antenna (e.g., the antennas 352a-352r), a transceiver (e.g., the transceivers 354a-354r), a processor (e.g., the controller/processor 380), and/or circuitry for outputting (e.g., the circuitry for outputting 1522). In certain aspects, various processors and/or various circuitry may include a circuit, a CPU, a GPU, a DSP, an ASIC, a FPGA, or other PLD, discrete gate or transistor logic, discrete hardware components, or any combination thereof designed to perform the functions described herein.

Example Aspects

Aspect 1: A method for wireless communications by a user equipment, comprising: receiving phase tracking reference signals (PTRSs); receiving configuration information associated with a plurality of configurations of the PTRSs; determining which one of the PTRSs to process based on the configuration information; and processing the determined PTRS.

Aspect 2: The method of Aspect 1, wherein processing the determined PTRS comprises measuring the determined PTRS and using the measurement to track a phase of an oscillator of the user equipment.

Aspect 3: The method of any one of Aspects 1-2, wherein each of the plurality of configurations of the PTRSs is associated with a different time scale.

Aspect 4: The method of any one of Aspects 1-3, wherein the PTRSs comprise first PTRSs having a first configuration and second PTRSs having a second configuration.

Aspect 5: The method of Aspect 4, wherein the first PTRSs have a higher density than the second PTRSs.

Aspect 6: The method of Aspect 4, wherein the first PTRSs have a longer time interval than the second PTRSs.

Aspect 7: The method of any one of Aspects 1-6, wherein the plurality of configurations of the PTRSs are based on at least one of a time density, a frequency density, or a resource element (RE) offset.

Aspect 8: The method of any one of Aspects 1-7, wherein the configuration information is received via a radio resource control (RRC) signaling.

Aspect 9: The method of any one of Aspects 1-8, further comprising: selecting one of the plurality of configurations of the PTRSs as a possible configuration for a correct PTRS pattern for a sidelink (SL) slot; and processing the PTRS having the selected configuration.

Aspect 10: The method of Aspect 8, wherein the configuration information received via the RRC signaling comprises sidelink control information including an index to indicate which one of the plurality of configurations of the PTRSs is used in a sidelink (SL) slot.

Aspect 11: The method of any one of Aspects 1-10, wherein the configuration information comprises sidelink control information including full configuration information of at least one of the PTRSs used in a sidelink slot.

Aspect 12: The method of Aspect 11, wherein the sidelink control information is received via a physical sidelink control channel (PSCCH).

Aspect 13: A method for wireless communications by a user equipment, comprising: configuring phase tracking reference signals (PTRSs) to have a plurality of configurations; and transmitting the PTRSs and configuration information to a plurality of user equipments, the configuration information being associated with the plurality of configurations of the PTRSs.

Aspect 14: The method of Aspect 13, wherein each of the plurality of configurations of the PTRSs is associated with a different time scale.

Aspect 15: The method of any one of Aspects 13-14, wherein the PTRSs comprise first PTRSs having a first configuration and second PTRSs having a second configuration.

Aspect 16: The method of Aspect 15, wherein the first PTRSs have a higher density than the second PTRSs.

Aspect 17: The method of Aspect 15, wherein the first PTRSs have a longer time interval than the second PTRSs.

Aspect 18: The method of any one of Aspects 13-17, wherein the plurality of configurations of the PTRSs are based on at least one of a time density, a frequency density, or a resource element (RE) offset.

Aspect 19: The method of any one of Aspects 13-18, wherein the configuration information is transmitted via a radio resource control (RRC) signaling.

Aspect 20: The method of Aspect 19, wherein the configuration information transmitted via the RRC signaling comprises sidelink control information including an index to indicate which one of the plurality of configurations of the PTRSs is used in a sidelink (SL) slot.

Aspect 21: The method of any one of Aspects 13-20, wherein the configuration information comprises sidelink control information including full configuration information of at least one of the PTRSs used in a sidelink slot.

Aspect 22: The method of Aspect 21, wherein the sidelink control information is transmitted via a physical sidelink control channel (PSCCH).

Aspect 23: A user equipment, comprising means for performing the operations of one or more of Aspects 1-12.

Aspect 24: A user equipment, comprising a transceiver and a processing system including at least one processor configured to perform the operations of one or more of Aspects 1-12.

Aspect 25: A user equipment, comprising means for performing the operations of one or more of Aspects 13-22.

Aspect 26: A user equipment, comprising a transceiver and a processing system including at least one processor configured to perform the operations of one or more of Aspects 13-22.

Aspect 27: An apparatus for wireless communications by a user equipment, comprising: an interface configured to obtain phase tracking reference signals (PTRSs), and obtain configuration information associated with a plurality of configurations of the PTRSs; and a processing system configured to determine which one of the PTRSs to process based on the configuration information and process the determined PTRS.

Aspect 28: An apparatus for wireless communications by a user equipment, comprising: a processing system configured to configure phase tracking reference signals (PTRSs) to have a plurality of configurations; and an interface configured to output, for transmission, the PTRSs and configuration information to a plurality of user equipments, the configuration information being associated with the plurality of configurations of the PTRSs.

Aspect 29: A computer-readable medium for wireless communications by a user equipment, comprising codes executable by an apparatus to: obtain phase tracking reference signals (PTRSs); obtain configuration information associated with a plurality of configurations of the PTRSs; determine which one of the PTRSs to process based on the configuration information; and process the determined PTRS.

Aspect 30: A computer-readable medium for wireless communications by a user equipment, comprising codes executable by an apparatus to: configure phase tracking reference signals (PTRSs) to have a plurality of configurations; and output, for transmission, the PTRSs and configuration information to a plurality of user equipments, the configuration information being associated with the plurality of configurations of the PTRSs.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node such as a UE or BS may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 11 and FIG. 12.

Further, it should be appreciated that modules and/or other appropriate means for performing (e.g., the controller/processor 380 and/or the antennas 352a-352r) the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A user equipment (UE), comprising:
   a memory comprising instructions; and
   one or more processors configured to execute the instructions and cause the UE to:
   receive a plurality of phase tracking reference signals (PTRSs);
   receive configuration information associated with a plurality of configurations corresponding to the plurality of PTRSs;
   determine which one of the plurality of PTRSs to process based on the configuration information and phase noise information of the UE; and
   process the determined PTRS.

2. The UE of claim 1, wherein the process comprises measure the determined PTRS and using the measurement to track a phase of an oscillator of the UE.

3. The UE of claim 1, wherein each of the plurality of configurations corresponding to the plurality of PTRSs is associated with a different time scale.

4. The UE of claim 1, wherein the plurality of PTRSs comprise first PTRSs having a first configuration and second PTRSs having a second configuration.

5. The UE of claim 4, wherein the first PTRSs have a higher density than the second PTRSs.

6. The UE of claim 4, wherein the first PTRSs have a longer time interval than the second PTRSs.

7. The UE of claim 1, wherein the plurality of configurations corresponding to the plurality of PTRSs are based on at least one of a time density, a frequency density, or a resource element (RE) offset.

8. The UE of claim 1, wherein the configuration information is received via a radio resource control (RRC) signaling.

9. The UE of claim 8, wherein the configuration information received via the RRC signaling comprises sidelink control information including an index to indicate which one of the plurality of configurations corresponding to the plurality of PTRSs is used in a sidelink (SL) slot.

10. The UE of claim 1, wherein the one or more processors are configured to execute the instructions and cause the UE to:

select one of the plurality of configurations corresponding to the plurality of PTRSs as a possible configuration for a correct PTRS pattern for a sidelink (SL) slot; and process a PTRS of the plurality of PTRSs having the selected configuration.

11. The UE of claim 1, wherein the configuration information comprises sidelink control information including full configuration information of at least one of the plurality of PTRSs used in a sidelink slot.

12. The UE of claim 11, wherein the sidelink control information is received via a physical sidelink control channel (PSCCH).

13. A first user equipment (UE), comprising:
a memory comprising instructions; and
one or more processors configured to execute the instructions and cause the first UE to:
  configure a plurality of phase tracking reference signals (PTRSs) to have a plurality of configurations; and
  transmit the plurality of PTRSs and configuration information associated with the plurality of configurations corresponding to the plurality of PTRSs to a second UE configured to determine which one of the plurality of PTRSs to process based on the configuration information and phase noise information of the second UE.

14. The first UE of claim 13, wherein each of the plurality of configurations corresponding to the plurality of PTRSs is associated with a different time scale.

15. The first UE of claim 13, wherein the plurality of PTRSs comprise first PTRSs having a first configuration and second PTRSs having a second configuration.

16. The first UE of claim 15, wherein the first PTRSs have a higher density than the second PTRSs.

17. The first UE of claim 15, wherein the first PTRSs have a longer time interval than the second PTRSs.

18. The first UE of claim 13, wherein the plurality of configurations corresponding to the plurality of PTRSs are based on at least one of a time density, a frequency density, or a resource element (RE) offset.

19. The first UE of claim 13, wherein the configuration information is transmitted via a radio resource control (RRC) signaling.

20. The first UE of claim 19, wherein the configuration information transmitted via the RRC signaling comprises sidelink control information including an index to indicate which one of the plurality of configurations corresponding to the plurality of PTRSs is used in a sidelink (SL) slot.

21. The first UE of claim 13, wherein the configuration information comprises sidelink control information including full configuration information of at least one of the plurality of PTRSs used in a sidelink slot.

22. The first UE of claim 21, wherein the sidelink control information is transmitted via a physical sidelink control channel (PSCCH).

23. A method for wireless communications at a user equipment (UE), comprising:
receiving a plurality of phase tracking reference signals (PTRSs);
receiving configuration information associated with a plurality of configurations corresponding to the plurality of PTRSs;
determining which one of the plurality of PTRSs to process based on the configuration information and phase noise information associated with of the UE; and
processing the determined PTRS.

24. The method of claim 23, wherein the plurality of configurations corresponding to the plurality of PTRSs are based on at least one of a time density, a frequency density, or a resource element (RE) offset.

25. The method UE of claim 23, further comprising:
selecting one of the plurality of configurations corresponding to the plurality of PTRSs as a possible configuration for a correct PTRS pattern for a sidelink (SL) slot; and
processing the PTRS having the selected configuration.

26. The method of claim 23, wherein the configuration information comprises sidelink control information including full configuration information of at least one of the plurality of PTRSs used in a sidelink slot.

27. A method for wireless communications at a first user equipment (UE), comprising:
configuring a plurality of phase tracking reference signals (PTRSs) to have a plurality of configurations; and
transmitting the plurality of PTRSs and configuration information associated with the plurality of configurations corresponding to the plurality of PTRSs to a second UE configured to determine which one of the plurality of PTRSs to process based on the configuration information and phase noise information of the second UE.

28. The method of claim 27, wherein each of the plurality of configurations corresponding to the plurality of PTRSs is associated with a different time scale.

29. The method of claim 27, wherein the plurality of configurations corresponding to the plurality of PTRSs are based on at least one of a time density, a frequency density, or a resource element (RE) offset.

30. The method of claim 27, wherein the configuration information comprises sidelink control information including full configuration information of at least one of the plurality of PTRSs used in a sidelink slot.

* * * * *